US011117629B1

(12) United States Patent
Wessels

(10) Patent No.: US 11,117,629 B1
(45) Date of Patent: Sep. 14, 2021

(54) HIGHWAY TRAILER WITH SLIDE-OUT UNDERCARRIAGE

(71) Applicant: Larry L. Wessels, Lakewood, CO (US)

(72) Inventor: Larry L. Wessels, Lakewood, CO (US)

(*) Notice: Subject to any disclaimer, the term of this patent is extended or adjusted under 35 U.S.C. 154(b) by 409 days.

(21) Appl. No.: 16/055,074

(22) Filed: Aug. 4, 2018

(51) Int. Cl.
*B62D 53/06* (2006.01)
*B60D 1/01* (2006.01)

(52) U.S. Cl.
CPC ......... *B62D 53/067* (2013.01); *B62D 53/068* (2013.01); *B60D 1/015* (2013.01)

(58) Field of Classification Search
CPC ..... B62D 53/067; B62D 53/068; B60D 1/015
See application file for complete search history.

(56) References Cited

U.S. PATENT DOCUMENTS

| 2,835,504 | A | * | 5/1958 | Acker | B62D 53/068 |
| | | | | | 280/81.1 |
| 3,317,219 | A | * | 5/1967 | Hindin | B60P 1/6481 |
| | | | | | 410/53 |
| 3,443,822 | A | * | 5/1969 | Weiss | B62D 21/14 |
| | | | | | 280/656 |
| 3,836,178 | A | * | 9/1974 | Ham | B62D 53/06 |
| | | | | | 280/418.1 |
| 4,132,326 | A | * | 1/1979 | Pinto | B60P 1/6418 |
| | | | | | 280/149.1 |
| 4,353,565 | A | * | 10/1982 | Smith | B62D 53/068 |
| | | | | | 280/149.2 |
| 4,365,820 | A | * | 12/1982 | Rush | B62D 53/0864 |
| | | | | | 280/149.2 |
| 4,944,522 | A | * | 7/1990 | Hart | B62D 53/085 |
| | | | | | 280/149.2 |
| 4,955,629 | A | * | 9/1990 | Todd, Jr. | B62D 53/067 |
| | | | | | 280/407 |
| 5,035,439 | A | * | 7/1991 | Petrillo | B60G 5/04 |
| | | | | | 280/81.6 |
| 5,314,201 | A | * | 5/1994 | Wessels | B62D 53/068 |
| | | | | | 180/209 |
| 5,346,233 | A | * | 9/1994 | Moser | B62D 53/068 |
| | | | | | 180/24.01 |

(Continued)

FOREIGN PATENT DOCUMENTS

FR 2646646 A1 * 11/1990 ............... B60P 3/40

*Primary Examiner* — Minnah L Seoh
*Assistant Examiner* — Maurice L Williams
(74) *Attorney, Agent, or Firm* — Edwin H. Crabtree; Ramon L. Pizarro

(57) ABSTRACT

A slide-out undercarriage mounted on an underside of a first trailer pulled by a highway tractor. The slide-out undercarriage is adapted for attaching a rear of the first trailer to a front of a second trailer. The slide-out undercarriage includes a fixed undercarriage frame mounted on an underside of a first trailer. A front axle with front wheels is mounted on a front axle frame and a rear axle with rear wheels is mounted on a rear axle frame. The rear axle frame includes a fifth wheel adapted for engaging a king pin on the front of the second trailer. A pair of first slide out tubes are attached to the front axle frame. A pair of second slide out tubes are attached to the rear axle frame. The first and second slide out tubes provide for allowing an operator of the first trailer to adjust the front and rear axles in various load positions under the first trailer when pulling the second trailer.

12 Claims, 3 Drawing Sheets

(56) References Cited

U.S. PATENT DOCUMENTS

| | | | | |
|---|---|---|---|---|
| 5,465,990 A * | 11/1995 | Wessels | B62D 53/068 | 180/209 |
| 5,564,727 A * | 10/1996 | Wessels | B62D 53/068 | 180/209 |
| 5,620,195 A * | 4/1997 | Wessels | B62D 53/068 | 280/149.2 |
| 5,716,071 A * | 2/1998 | Stanley | B62D 53/00 | 280/149.2 |
| 5,758,890 A * | 6/1998 | Wessels | B62D 53/067 | 280/149.2 |
| 5,863,057 A * | 1/1999 | Wessels | B62D 53/068 | 280/149.2 |
| 6,240,339 B1 * | 5/2001 | von Mayenburg | B60G 17/016 | 280/405.1 |
| 6,279,933 B1 * | 8/2001 | Ross | B62D 53/068 | 280/149.2 |
| 6,488,303 B1 * | 12/2002 | Cobb | B62D 53/068 | 180/209 |
| 6,793,233 B2 * | 9/2004 | Eckelberry | B60P 1/00 | 280/149.2 |
| 9,033,353 B2 * | 5/2015 | Horton | B62D 61/00 | 280/149.2 |
| 9,039,022 B2 * | 5/2015 | Horton | B62D 53/06 | 280/149.2 |
| 2010/0301584 A1 * | 12/2010 | Pipe | B62D 53/045 | 280/418.1 |
| 2013/0297154 A1 * | 11/2013 | Burchett | B62D 53/068 | 701/49 |
| 2016/0137238 A1 * | 5/2016 | Faymonville | B60P 3/40 | 280/423.1 |

* cited by examiner

HIGHWAY TRAILER WITH SLIDE-OUT UNDERCARRIAGE

BACKGROUND OF THE INVENTION

(a) Field of the Invention

This invention relates to a highway first trailer with a tractor for pulling a second trailer therebehind and more trailers, and more particularly, but not by way of limitation, to a slide-out undercarriage with a pair of tandem wheel axles attached to the rear of the first trailer. The undercarriage includes a fifth wheel for releasable attachment to a king pin mounted on a front of the second trailer. Also, the undercarriage can be built with tubular and/or beams using different types of materials.

(b) Discussion of Prior Art

In U.S. Pat. Nos. 5,314,201, 5,465,990, 5,564,727, 5,620,195, 5,578,890, 5,758,890, and 5,863,057, to the subject inventor, an all-pneumatic locking pin insertion and retraction system for a sliding undercarriage with a pair of tandem wheel axles is described for mounting under a semitrailer pulled by a tractor. The locking pin system provides for adjustment of the undercarriage along the length of the rear of the trailer for load balancing and adjusting the trailer's turning radius during city deliveries and cross country travel. The locking system includes an air pressure protection valve to prevent the operation of the system if the pressurized air source drops below a predetermined amount of air pressure. Also, a latching system is disclosed in the U.S. Pat. No. 5,758,890. The subject matter found in the above mentioned patents is incorporated herein by reference and used in the operation of the subject invention to accomplish the unique features, advantages and objects as set forth.

SUMMARY OF THE INVENTION

In view of the foregoing, it is a primary objective of the subject invention to provide a first trailer with a rearward extension and forward retraction, slide-out undercarriage with a tubular design or beam design. The undercarriage is used with a locking pin insertion and retraction system for moving a rear axle frame with a fifth wheel into a rearward, extended position for attachment to and pulling a second trailer.

Another key object of the invention is the slide-out undercarriage provides for increased highway safety by helping prevent lateral movement and fish-tailing of the second trailer during highway travel. Also, the undercarriage can be used for pulling a third or more trailers.

Still another object of the slide-out undercarriage is when not pulling a second trailer, it can be retracted under the rear of the first trailer and adjusted for trailer loads thereon and adjusted for different trailer turning radius.

The slide-out undercarriage includes a fixed undercarriage frame adapted for mounting to a rear of an underside of a first trailer. The undercarriage frame includes a pair of parallel "C" shaped channel members. The channel members includes a plurality of spaced apart locking pin holes for receiving locking pins therethrough. The undercarriage frame also includes a front axle with front wheels mounted on a front axle frame. The front axle frame is attached to a bottom of the undercarriage frame. Further, the undercarriage frame includes a rear axle with rear wheels mounted on a rear axle frame. The rear axle frame is also attached to the bottom of the undercarriage frame. The rear axle frame includes a fifth wheel adapted for engaging a king pin on the front of a second trailer.

The front axle frame is attached to a pair of parallel first slide out tubes for sliding the front axle frame outwardly toward the rear of the first trailer. The rear axle frame is attached to a pair of parallel second slide out tubes for sliding the rear axle frame outwardly and extending beyond the rear of the first trailer. The first slide out tubes are slidably received inside the second slide out tubes. The first and second slide out tubes provide a unique feature of allowing an operator of the first trailer to adjust the front and rear axles in various load positions under the first trailer and when pulling a second trailer.

These and other objects of the present invention will become apparent to those familiar with different types of trailer and semi-trailer undercarriages for pulling a second trailer when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject trailer slide-out undercarriage, and in which.

DETAILED DESCRIPTION OF THE PREFER'" D EMBODIMENTS

Figure 1:
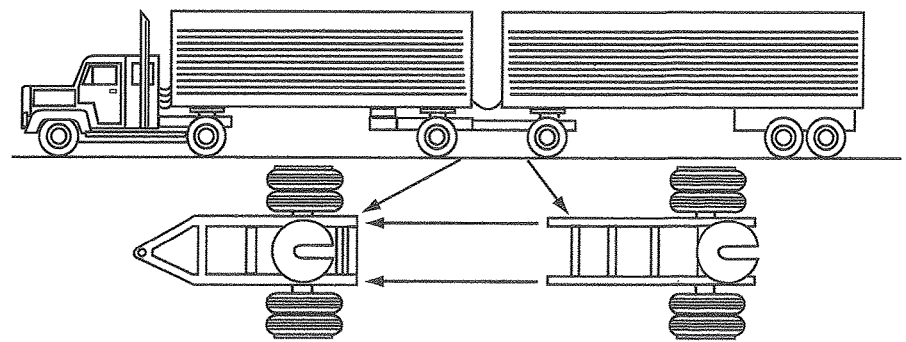
FIG. 1 is a side view of a highway tractor pulling a first and second trailer using a prior art single or double trailer hitch with fifth wheel.

In FIG. 1, a side view of a highway tractor pulling a first and second trailer is shown using a prior art single or double trailer hitch with fifth wheel mounted on a single wheel axle assembly. The fifth wheel is used for attachment to a king pin on the front of a second trailer. These two types of trailer hitches tend to move laterally, due to cross winds and high speeds, during highway travel, thus causing the second trailer to fish tail presenting a dangerous driving condition.

Figure 2:
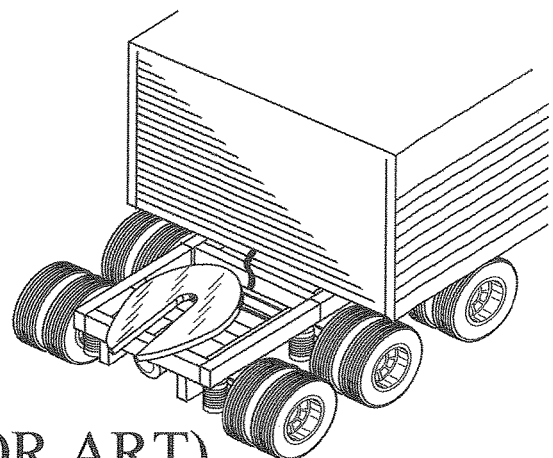
FIG. 2 is a perspective view of a triple wheel prior art axle assembly with a rear axle having a fifth wheel mounted thereon.

In FIG. 2, a perspective view of a triple wheel axle assembly is shown with a rear axle having a fifth wheel mounted thereon. This prior art axle assembly is fixed to the rear of the first trailer with the rear axle and fifth wheel attached to the front of the second trailer. This prior art unit is not retractable under the rear of the first trailer and therefore can't be adjusted for load distribution or adjustment of the trailer's turning radius.

Figure 3:
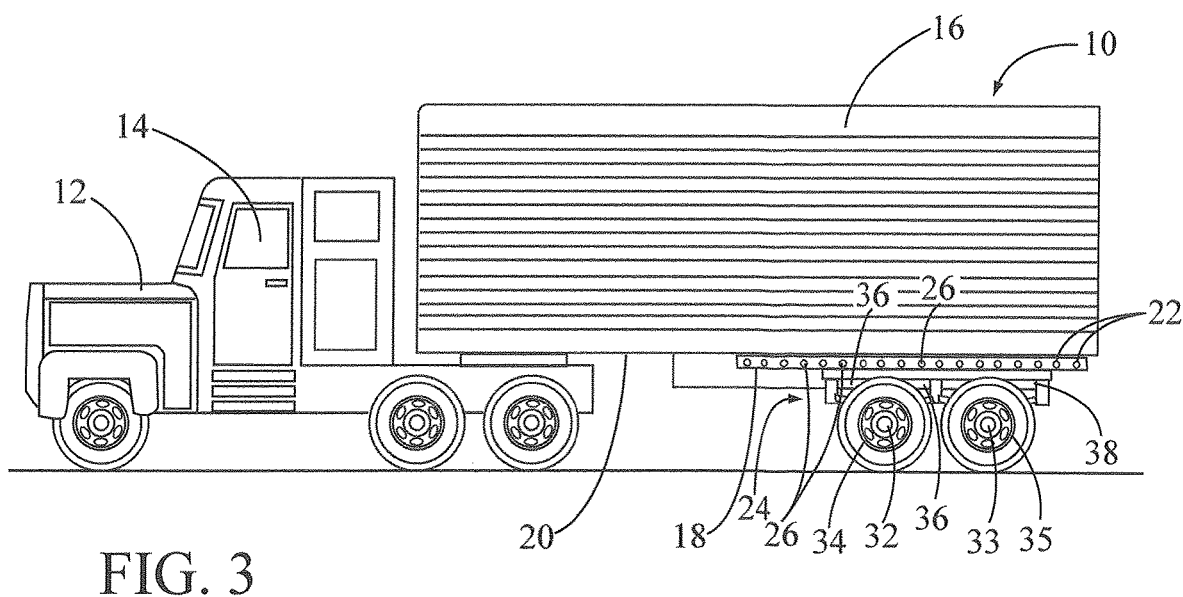
FIG. 3 is a side view of the highway truck with first trailer and having the subject slide-out undercarriage mounted thereon and adapted for pulling a second trailer.

In FIG. 3, a side view of a typical highway truck is shown having general reference numeral 10. The truck 10 includes a tractor 12 with cab 14 for pulling a first semitrailer 16. The trailer 16 is shown in dashed lines in FIGS. 5 and 6.

The first trailer 16 includes a pair of spaced apart rails 18 mounted along the length of the trailer's underside 20. The rails 18 include a plurality of locking pin holes 22, generally spaced 3 to 6 inches apart along the length of the rails.

Figure 4:
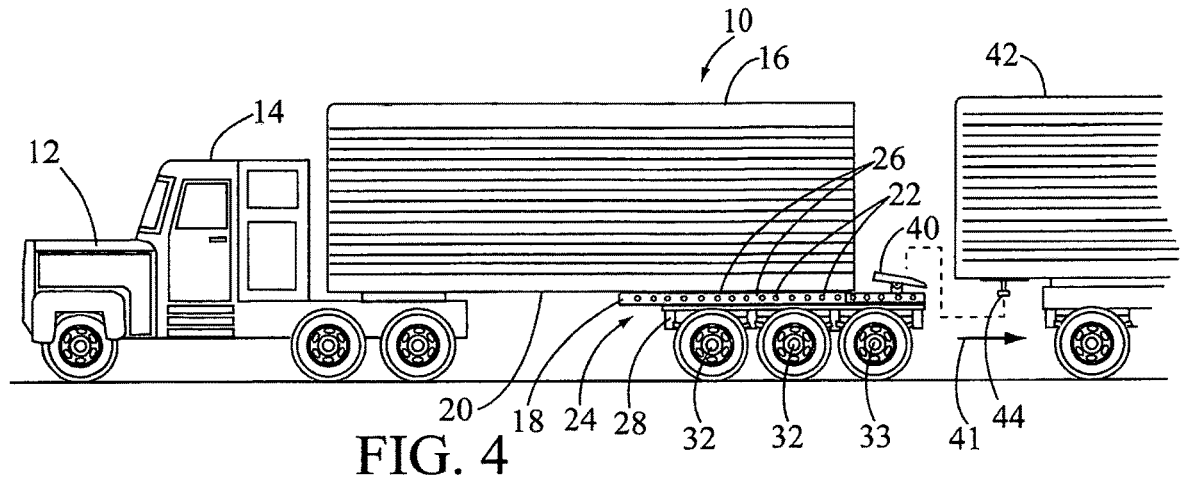
FIG. 4 is another side view of the truck and first trailer with a rear axle and rear axle frame extended outwardly from the rear of the trailer for attaching to the second trailer.
Figure 5:
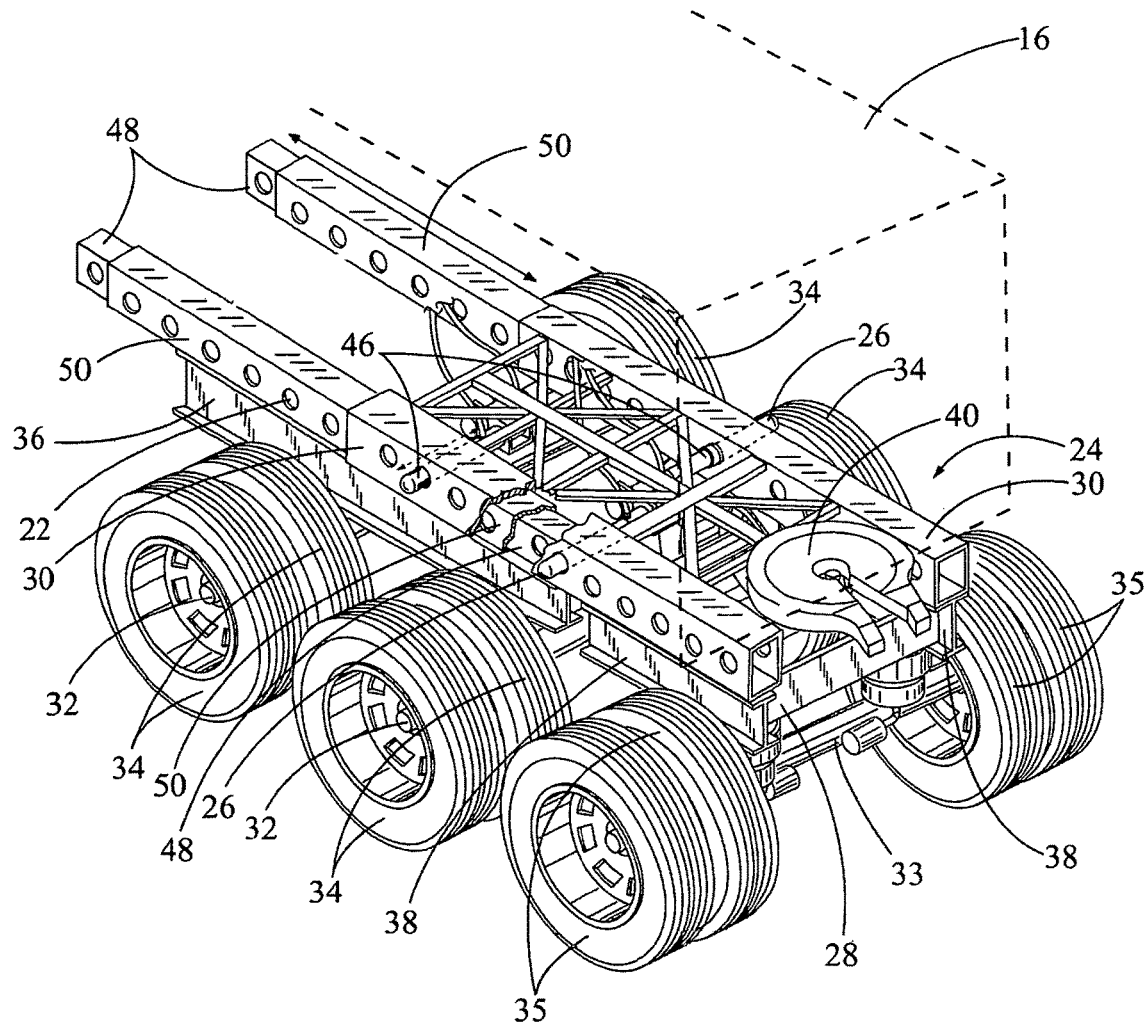
FIG. 5 is a perspective view of the slide-out undercarriage with the first and second axle frames in a retracted position under the rear of the first trailer.
Figure 6:
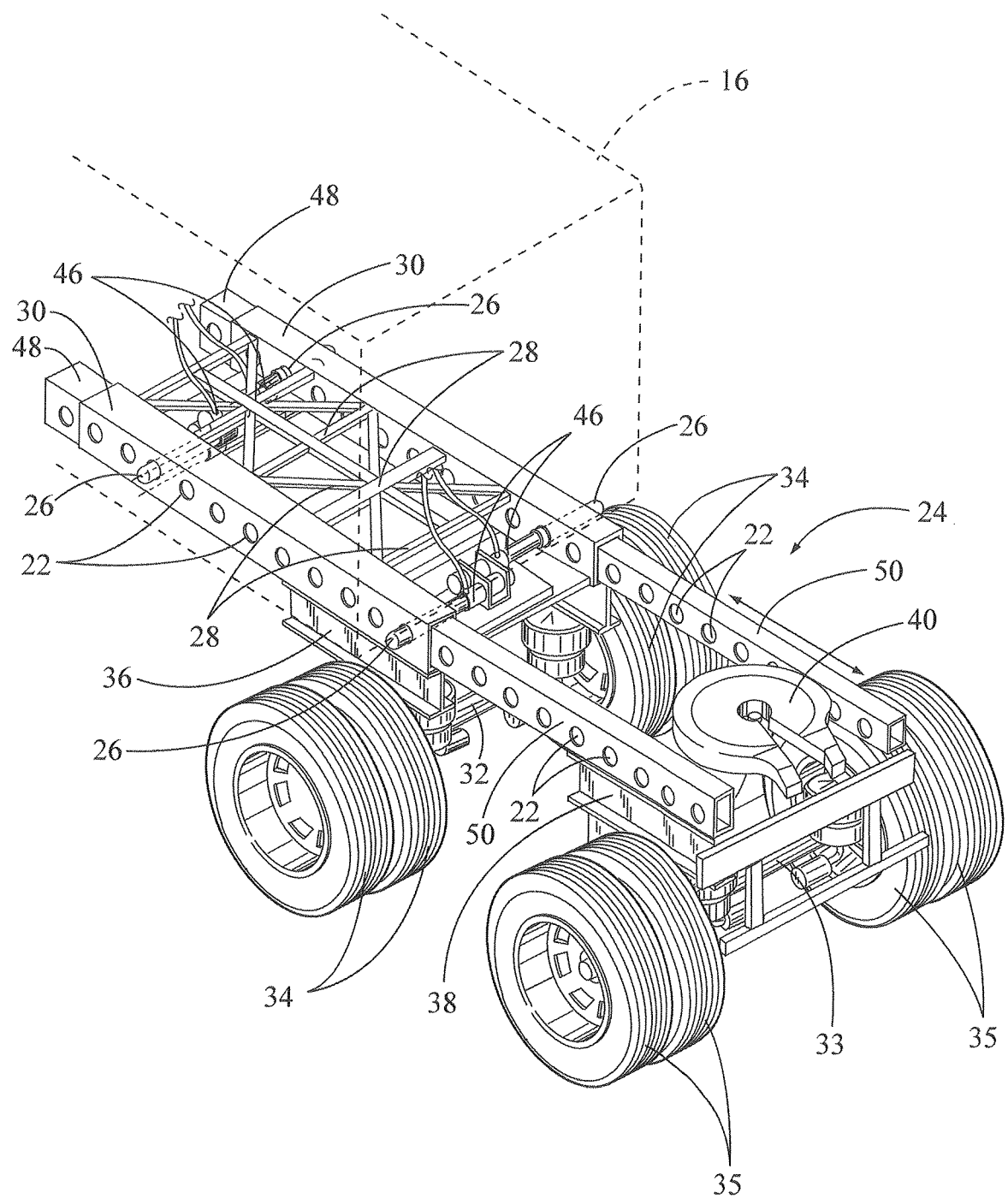
FIG. 6 is a perspective view of the slide-out undercarriage with the first and second axle frames in an extended position. The second axle frame and fifth wheel are shown positioned for attaching to a front of the second trailer.

The subject slide-out undercarriage is shown in this drawing and in FIGS. 4, 5 and 6 having a general reference numeral 24. The undercarriage 24 is movable along the length of the rear of the trailer 16 and into an extended position outwardly from the rear of the trailer, as shown in FIGS. 4 and 6. The undercarriage 24 is secured to the rails 18 using a plurality of high pressure, air operated, locking pins 26 received in the locking pin holes 22.

The slide-out undercarriage 24 includes a fixed undercarriage frame 28 attached to the rear of the underside 20 of the trailer 16. The frame 28, shown in FIGS. 5 and 6, includes a pair of parallel, "C" shaped channel members 30. The channel members 30 also include locking pin holes 22 for receiving locking pins 26 therethrough. The undercarriage 24 also includes a front axle 32 with front wheels 34 and a rear axle 33 with rear wheels 35. The front axle 32 is mounted on a front axle frame 36. The rear axle 33 is mounted on a rear axle frame 38. The front and rear axles 32 and 33 are movable along a length of the channel members 30, as shown in FIGS. 5 and 6.

In FIG. 4, the slide-out undercarriage 24 is shown with the rear axle 33 and rear axle frame 38 positioned outwardly from rear of the first trailer 16. In this drawing, the rear axle frame 38 can be seen with a fifth wheel 40 mounted on top of the frame. In this position, the tractor 12 can back the fifth wheel 40, as indicated by arrow 41, under the front of a second trailer 42 for engaging a king pin 44 and then pulling the second trailer 42 behind the first trailer 16.

In FIG. 5, a perspective view of the slide-out undercarriage 24 is illustrated with the first and second axle frames 36 and 38 in a retracted position under the rear of the trailer 16. In this view, two pair of locking pins 26, operated by high pressure air cylinders 46, are shown received through opposite sides of the "C" shaped channel members 30 and through selected locking pin holes 22.

In this drawing, the first axle frame 36 is shown attached to a pair of angular shaped, first slide-out tubes 48. The second axle frame 38 is shown attached to a pair of angular shaped, second slide-out tubes 50. The first slide-out tubes 48 are slideably received inside the second slide-out tubes 50. The second slide-out tubes 50 are slideably received inside the pair of "C" shaped channel members 30. A portion of one of the "C" shaped channel members 30 is cutaway to illustrate the tubes 48 and 59 inside the channel member. While the first and second slide-out tubes 48 and 50 are discussed and shown herein, it should be noted slide-out beams can be used equally well with the slide-out undercarriage.

In FIG. 6, the first and second axle frames 36 and 38 are shown in an extended position at the rear of the trailer 16. The first axle frame 36 is disposed at the rear of the trailer 16. The second axle frame 38 is extended past the rear of the trailer positioned. positioned for attaching to the front of the second trailer 42, shown in FIG. 4.

In operation and by pulling the locking pins 26 form the locking pin holes 22, the first and second slide-out tubes 48 and 50 are free to slide inside the "C" shaped channel members 30. For example, by releasing the brakes, using a shuttle valve, on the first axle 32 and setting the brakes on the second axle 33, the truck operator can move the trailer 16 forward with the first slide-out tube 48 sliding outwardly from inside the second slide-out tube 50 and thus extending the rear axle frame 38 outwardly from the rear of the trailer. Also, the first axle 32 can be adjusted along the length of the rear of the trailer. This is done by releasing the brakes on the second axle 33 and setting the brakes on the first axle 32 and moving the trailer backward or forward for positioning the first axle to a desired location at the rear of the trailer. When the first axle 32 is properly positioned, the operator reengages the locking pins 26 in selected locking pin holes 22 for securing the two axles to the rear of the trailer.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The invention claimed is:

1. A slide-out undercarriage mounted on an underside of a first trailer pulled by a highway tractor, the slide-out undercarriage adapted for attaching a rear of the first trailer to a front of a second trailer, the slide-out undercarriage comprising:
    a fixed undercarriage frame adapted for mounting to a rear of an underside of a first trailer;
    a pair of front axles with front wheels mounted on a front axle frame, the front axle frame attached to a bottom of the undercarriage frame;
    a rear axle with rear wheels mounted on a rear axle frame, the rear axle frame attached to the bottom of the undercarriage frame, the rear axle with the rear wheels can be moved independently from the front axles with front wheels for load adjustment;
    a fifth wheel mounted on the rear axle frame, the fifth wheel adapted for engaging a king pin on the front of a second trailer;
    a pair of parallel first slide out tubes attached to the front axle frame, the first slide out tubes used for sliding the front axle frame outwardly toward the rear of the first trailer; and
    a pair of parallel second slide out tubes attached to the rear axle frame, the second slide out tubes used for sliding the rear axle frame outwardly and extending beyond the rear of the first trailer and returning the rear axle frame to the rear of the first trailer;
    whereby, the first and second slide out tubes provide for allowing an operator of the first trailer to adjust the front axles and the rear axle in various load positions under the first trailer when pulling a second trailer.

2. The slide-out undercarriage as described in claim 1 further including a pair of spaced apart, parallel "C" shaped channel members attached to the undercarriage frame.

3. The slide-out undercarriage as described in claim 2 wherein the channel members including a plurality of spaced apart locking pin holes adapted for receiving locking pins therethrough.

4. The slide-out undercarriage as described in claim 2 wherein the front axle frame is attached to the "C" shaped channel members.

5. The slide-out undercarriage as described in claim 4 wherein the rear axle frame is attached to the "C" shaped channel members.

6. The slide-out undercarriage as described in claim 1 wherein the first and second slide out tubes include a plurality of spaced apart locking pin holes adapted for receiving locking pins therethrough.

7. The slide-out undercarriage as described in claim 1 wherein the first slide out tubes are slidably received inside the second slide out tubes.

8. A slide-out undercarriage mounted on an underside of a first trailer pulled by a highway tractor, the slide-out undercarriage adapted for attaching a rear of the first trailer to a front of a second trailer, the slide-out undercarriage comprising:
- a fixed undercarriage frame adapted for mounting to a rear of an underside of a first trailer, the undercarriage frame including a pair of parallel "C" shaped channel members:
- a pair of front axles with front wheels mounted on a front axle frame, the front axle frame attached to the "C" shaped channel members;
- a rear axle with rear wheels mounted on a rear axle frame, the rear axle frame attached to the "C" shaped channel members, the rear axle with the rear wheels can be moved independently from the front axles with front wheels for load adjustment;
- a fifth wheel mounted on the rear axle frame, the fifth wheel adapted for engaging a king pin on the front of a second trailer;
- a pair of parallel first slide out tubes attached to the front axle frame, the first slide out tubes used for sliding the front axle frame outwardly toward the rear of the first trailer; and
- a pair of parallel second slide out tubes attached to the rear axle frame, the second slide out tubes used for sliding the rear axle frame outwardly and extending beyond the rear of the first trailer and returning the rear axle frame to the rear of the first trailer, the first slide out tubes slidably received inside the second slide out tubes;
- whereby, the first and second slide out tubes provide for allowing an operator of the first trailer to adjust the front axles and the rear axle in various load positions under the first trailer when pulling a second trailer.

9. The slide-out undercarriage as described in claim 8 wherein the "C" shaped channel members including a plurality of spaced apart locking pin holes adapted for receiving locking pins therethough.

10. The slide-out undercarriage as described in claim 8 wherein the first and second slide out tubes include a plurality of spaced apart locking pin holes adapted for receiving locking pins therethrough.

11. A slide-out undercarriage mounted on an underside of a first trailer pulled by a highway tractor, the slide-out undercarriage adapted for attaching a rear of the first trailer to a front of a second trailer, the slide-out undercarriage comprising:
- a fixed undercarriage frame adapted for mounting to a rear of an underside of a first trailer, the undercarriage frame including a pair of parallel "C" shaped channel members, the "C" shaped channel members having a plurality of spaced apart locking pin holes adapted for receiving locking pines therethrough;
- a pair of front axles with front wheels mounted on a front axle frame, the front axle frame attached to the "C" shaped channel members;
- a rear axle with rear wheels mounted on a rear axle frame, the rear axle frame attached to the "C" shaped channel members, the rear axle with the rear wheels can be moved independently from the front axles with front wheels for load adjustment;
- a fifth wheel mounted on the rear axle frame, the fifth wheel adapted for engaging a king pin on the front of a second trailer;
- a pair of parallel first slide out tubes attached to the front axle frame, the first slide out tubes used for sliding the front axle frame outwardly toward the rear of the first trailer, the first slide out tubes having a plurality of spaced apart locking pin holes adapted for receiving locking pins therethrough; and
- a pair of parallel second slide out tubes attached to the rear axle frame, the second slide out tubes used for sliding the rear axle frame outwardly and extending beyond the rear of the first trailer and returning the rear axle frame to the rear of the first trailer, the second slide out tubes having a plurality of spaced apart locking pin holes adapted for receiving locking pins therethrough;
- whereby, the first and second slide out tubes provide for allowing an operator of the first trailer to adjust the pair of front axles and there rear axle in various load positions under the first trailer when pulling a second trailer.

12. The slide-out undercarriage as described in claim 11 wherein the first slide out tubes are slidably received inside the second slide out tubes.

* * * * *